Figure 1:
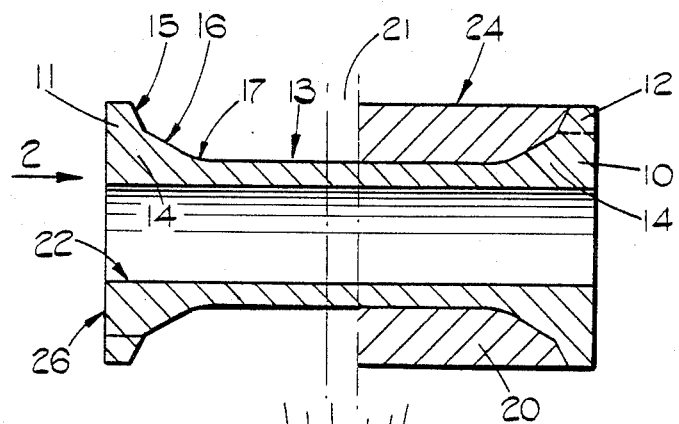
Figure 1:
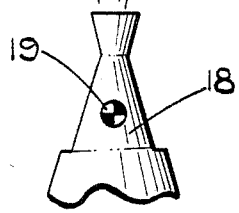

United States Patent [19]

Richmond

[11] Patent Number: 4,523,365
[45] Date of Patent: Jun. 18, 1985

[54] METHOD OF MANUFACTURING BEARING BLOCKS

[75] Inventor: Anthony J. C. Richmond, Solihull, England

[73] Assignee: Lucas Industries public limited company, Birmingham, England

[21] Appl. No.: 404,866

[22] Filed: Aug. 3, 1982

[30] Foreign Application Priority Data

Aug. 5, 1981 [GB] United Kingdom ............... 8123921
Mar. 16, 1982 [GB] United Kingdom ............... 8207634

[51] Int. Cl.³ .............................................. B21D 53/10
[52] U.S. Cl. .............................. 29/527.4; 29/149.5 R; 29/149.5 PM; 29/149.5 C; 29/527.2; 164/46; 415/170 R
[58] Field of Search ........... 29/527.4, 148.4 A, 401.1, 29/403.1, 403.3, 402.01, 402.02, 402.03, 402.04, 402.05, 402.06, 402.07, 402.08, 402.09, 402.11, 402.12, 402.14, 402.15, 402.17, 149.5 PM, 149.5 R, 527.3, 148.4 R, 527.2; 164/46; 415/170 R

[56] References Cited

U.S. PATENT DOCUMENTS

| 2,145,460 | 1/1939 | Ryder ............... 29/149.5 PM |
| 2,164,737 | 7/1939 | Ford ................ 29/149.5 PM |
| 2,187,755 | 1/1940 | Ryder ............... 29/149.5 PM |
| 2,490,543 | 12/1949 | Robertson et al. ....... 29/527.2 |
| 2,966,423 | 12/1960 | Shichman ................ 164/46 |
| 3,155,439 | 11/1964 | Guzewicz ........... 29/149.5 PM |
| 3,295,198 | 1/1967 | Coan .................. 29/527.4 |
| 3,397,732 | 8/1968 | Howell, Jr. ............. 164/46 |

Primary Examiner—Howard N. Goldberg
Assistant Examiner—Vernon K. Rising

[57] ABSTRACT

A method of manufacturing a bearing block comprises flame spraying a light alloy layer on to the outside of an antifriction alloy bush, to build up the block to required outer dimensions. The outside of the block may be finish machined after the flame sprayed layer has been applied.

3 Claims, 3 Drawing Figures

METHOD OF MANUFACTURING BEARING BLOCKS

This invention relates to a method of manufacturing bearing blocks for rotatable members, and in particular to a method of manufacturing such blocks for use in gear pumps.

It is known, in gear pumps, to support the gear elements between bearing blocks which are axially slidable within the pump housing and which abut axially-directed faces of the gears. These bearing blocks incorporate low friction alloy bushes. It is undesirable that the whole block should be made of a low friction alloy, because of the difference between the temperature-coefficiency of expansion of these alloys and of the light alloys normally used for the pump housing. It is therefore common practice to include an anti-friction bush in a light alloy bearing block.

It has been found difficult to secure the bushes within the light alloy blocks over the temperature range likely to be encountered in gear pumps, the upper limit of this range being of the order of 175° C. The material used for the bushes typically has a lead content of between 27 and 37%. This high lead content is required for bearing properties at higher temperatures, but results in a material which is mechanically weaker than material with a lower lead content. The mechanical weakness of the bush material precludes shrink fitting of the blocks onto the bushes, since the bushes will not support the resultant compressive loads. Moulding or casting light alloy around the bush cannot be effected because the required temperature of 600° C. will melt the lead in the bush.

It is currently the practice to secure bushes within the light alloy surround either by soldering or using a synthetic resin adhesive. It is, however, difficult to ensure that there are no voids in the solder or resin, as appropriate, or to detect whether these are present after the process is complete. Moreover, since passages for pressure balance commonly extend from the bore of the bearing block to its outer surface, and thereby pass through the interface area between the bush and the light alloy, high pressure liquid may enter any void present and further weaken the bond between the bush and the surrounding light alloy. It is also the case that a soldered joint will weaken at the operating temperatures of 175° C. which are now envisaged.

It is an object of the present invention to provide a method of manufacturing bearing blocks within incorporate an antifriction alloy bush in a light alloy surround, and in which the foregoing problems are overcome.

According to the invention a method of manufacturing a bearing block comprises providing an antifriction alloy bush and flame spraying light alloy around the outer surfaces of the bush until a depth of light alloy is built up to at least the dimensions of the required block.

In a preferred embodiment a flame spraying device is moved relatively to said bush so as to direct said light alloy substantially perpendicularly of said outer surface.

Figure 2:
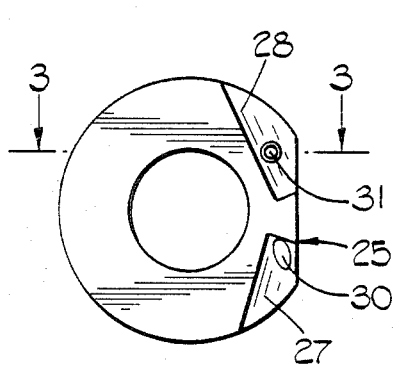
Figure 3:
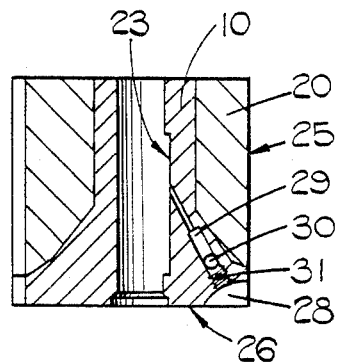

A particular embodiment of the invention will now be described by way of example only and with reference to the accompanying drawings, in which:

FIG. 1 is a section through a bearing block at an intermediate stage of its manufacture, FIG. 2 is a view of a finished block on arrow 2 in FIG. 1, and FIG. 3 is a section on line 3—3 in FIG. 2.

FIG. 1 shows an intermediate stage in the manufacture of a bearing block for a gear pump of the general type described in U.S. Pat. No. 4,233,055 which is incorporated herewith by reference. An antifriction alloy bush 10 has flanges 11, 12 at its respective ends. The bush 10 is of a material commonly referred to as high-lead bronze, and has the following components:

Lead: 27–37%
Tin: 1.5–2.5%
Nickel: 0.25–0.75%
Zinc iron and Antimony in small percentages,
Copper—the remainder.

The outer surface of the bush 10 includes a cylindrical portion 13 and fillets 14 which extend from the portion 13 to the peripheries of the flanges 11, 12. Each of the fillets 14, defines a first frusto-conical surface 15 having an included angle of 120° and extending inwardly from the periphery of the associated flange to a diameter approximately 0.80 of that of the flange periphery. A second frusto-conical surface 16 has an included angle of 60° and intersects the surface 15. The surface 16 blends to the surface 13 by a radius 17.

The bush 10 is electroplated externally with nickel up to a depth of 0.05 mm and is subsequently grit blasted to roughen the surface of the nickel coating. A layer of nickel aluminide is then flame sprayed onto the nickel coating to a depth of between 0.075 and 0.150 mm. The bush is mounted in a suitable rig (not shown) for rotation about its axis. The flame spray nozzle, indicated at 18, is mounted on the rig with the nozzle end approximately 65 mm from the circumference of the bush 10. The nozzle 18 is reciprocated angularly about an axis 19 which is approximately 80 mm from the circumference of the bush 10, rotation of the bush 10 and reciprocation of the nozzle 18 being such as to ensure an even distribution of the flame-sprayed material between the flanges 11, 12.

A thick aluminium layer, indicated at 20 on the right of FIG. 1, is then flame sprayed over the bush 10 between the flanges 11, 12 using the technique described above, to build up the layer 20 to the peripheries of the flanges 11, 12.

The provision of the fillets 14 and the flame spraying technique described above has been found to prevent the appearance of striations on the subsequently machined periphery of the block, these striations otherwise being particularly apparent adjacent the flanges 14, and resulting from some of the sprayed particles splashing back from the flanges 14.

In a particular example the nickel aluminide is of the type available under the designation METCO 404, and the aluminium layer 20 comprises METCO S.F. aluminium, both of these materials being obtainable from METO public limited company, of Chobham, England.

Flame spraying is to be understood as any process by which a material is raised to its melting point, atomised and directed as a stream towards a workpiece to produce a coating thereon, and includes plasma spraying in which a powdered material is introduced into a stream of inert gas which has been raised to a temperature of the order of 16500° C. by means of an electric arc. The coated bush is then parted between the lines 21 and the bores 22 of each block are machined to include a recess 23 (FIG. 3) which is located at a zone of the bore 22 against which a gear element of the pump will be urged as a result of a high pressure in the pump outlet. Each block is also machined to provide the required dimensions of the periphery 24, as well as a flat 25 which will engage a corresponding flat on an adjacent block in a pump.

The gear-engaging face 26 of each block is machined to provide two relieved zones 27, 28 which will communicate with the respective high pressure and low pressure ports of the pump. A passage 29 is drilled between the relieved zone 28 and the recess 23 in the bore. A cross passage 30 is drilled between the zone 27 and the passage 29. A blanking plug 31 is inserted to isolate the passages 29, 30 from the zone 28. In use the passages 29, 30 thus provide high pressure liquid to the recess 23, and this liquid pressure opposes a load on a gear shaft resulting from high pressure in the pump outlet.

The passages 27,30 lie entirely within the bush portion of the bearing block, and are largely accommodated by the fillet 14 of the bush 10. There is therefore no risk that high pressure liquid may enter the interface area between the bush 10 and light alloy coating 20.

The bearing blocks are axially slidable within a housing of the pump and are subject to considerable forces transversely of their axes. The porosity of a flame sprayed light alloy coating had previously been considered to render such a coating unsuitable for bearing blocks of the type described. Surprisingly, however, bearing blocks manufactured by the method of the present invention are as resistant to wear as blocks having light alloy surrounds which are machined from the solid. This resistance to wear may arise from oxidation of some of the sprayed aluminium, whereby the coatings of the blocks include a proportion of alumina.

What is claimed is:

1. A method of manufacturing a bearing block for a gear pump, comprising forming an antifriction bush of a lead-bronze material having a lead content of between 27% and 37%, said bush having an outer surface which includes a cylindrical portion, an outwardly extending flange whose radial dimension is at least equal to that of the required block, and a fillet extending from said cylindrical portion to adjacent the periphery of said flange, electroplating a nickel layer on said outer surface and flame spraying light alloy over said nickel layer to build up said light alloy to the radial dimension of said flange.

2. A method as claimed in claim 1 which includes the step of spraying a layer of nickel aluminide on to said electroplated layer.

3. A gear pump comprising a housing having an inlet and an outlet and a pair of externally meshed gears journalled in bearing blocks within said housing, each said bearing block comprising an antifriction bush of a lead-bronze material having a lead content of between 27% and 37%, said bush having an outer surface which includes a cylindrical portion, an outwardly extending flange whose radial dimensions correspond to those of said block and a fillet extending from said cylindrical portion to adjacent the periphery of said flange, an electroplated nickel layer on said outer surface and a light alloy body flame sprayed over said nickel layer to the radial extent of said flange.

* * * * *